United States Patent
Fingland et al.

(10) Patent No.: US 10,618,002 B2
(45) Date of Patent: Apr. 14, 2020

(54) SYSTEM AND METHOD FOR TREATING AMBIENT AIR

(71) Applicant: Tenneco Automotive Operating Company Inc., Lake Forest, IL (US)

(72) Inventors: Bradley Fingland, Mason, MI (US); Michael C. Bradford, Charleston, WV (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/227,022

(22) Filed: Dec. 20, 2018

(65) Prior Publication Data
US 2019/0118140 A1    Apr. 25, 2019

(51) Int. Cl.
*B01D 53/88* (2006.01)
*B62D 35/00* (2006.01)
(Continued)

(52) U.S. Cl.
CPC ....... *B01D 53/885* (2013.01); *B01D 53/8696* (2013.01); *B60K 11/085* (2013.01);
(Continued)

(58) Field of Classification Search
CPC .......... B01D 53/885; B01D 2259/4558; B01D 2279/40; B01D 46/44; B01D 53/8696;
(Continued)

(56) References Cited

U.S. PATENT DOCUMENTS

| 3,738,088 A | 6/1973 | Colosimo |
| 5,147,429 A * | 9/1992 | Bartholomew ........ B01D 46/42 244/30 |

(Continued)

FOREIGN PATENT DOCUMENTS

| DE | 4007965 | 3/1994 |
| JP | H08273613 | 10/1996 |

(Continued)

OTHER PUBLICATIONS

EMPRO™ PremAir® Catalysts, https://catalysts.basf.com/products-and-industries/mobile-emissions-catalysts/specialized-catalysts/premair, accessed Dec. 19, 2018.

(Continued)

*Primary Examiner* — Timothy C Vanoy
(74) *Attorney, Agent, or Firm* — McGarry Bair PC

(57) ABSTRACT

A system for treating ambient air is provided. The system includes a flow control structure disposed on a vehicle. The flow control structure is adapted to control flow of ambient air received during movement of the vehicle. The system further includes an actuator operatively coupled to the flow control structure. The actuator is adapted to movably adjust the flow control structure. The system further includes a controller disposed on the vehicle and communicably coupled to the actuator. The controller is configured to control the actuator based on at least a quality of ambient air. The system further includes an air treatment component for selectively receiving ambient air from the flow control structure. The air treatment component is adapted to treat at least one pollutant present in ambient air.

19 Claims, 11 Drawing Sheets

(51) Int. Cl.
*B60K 11/08* (2006.01)
*F01P 7/12* (2006.01)
*F01P 11/12* (2006.01)
*B01D 46/44* (2006.01)
*B01D 53/86* (2006.01)
*F01P 3/20* (2006.01)

(52) U.S. Cl.
CPC .............. *B62D 35/007* (2013.01); *F01P 3/20* (2013.01); *F01P 7/12* (2013.01); *B01D 46/44* (2013.01); *B01D 2259/4558* (2013.01); *B01D 2279/40* (2013.01); *F01P 11/12* (2013.01); *F01P 2060/02* (2013.01); *F01P 2060/04* (2013.01); *F01P 2060/045* (2013.01)

(58) Field of Classification Search
CPC ............ B01D 2221/08; B01D 2221/16; B01D 2258/06; B62D 35/007; B60K 11/085; F01P 7/12; F01P 2060/045; F01P 11/12; F01P 3/20; F01P 2060/02; F01P 2060/04; A61L 9/00; A61L 2209/00; A61L 2209/10; A61L 2209/11; A61L 2209/111; A61L 2209/14; A61L 2209/22
See application file for complete search history.

(56) References Cited

U.S. PATENT DOCUMENTS

| | | | |
|---|---|---|---|
| 5,422,331 A | 6/1995 | Galligan et al. | |
| 5,676,913 A * | 10/1997 | Cirillo | B01D 46/0052 423/219 |
| 5,833,931 A | 11/1998 | Fromson et al. | |
| 5,997,831 A | 12/1999 | Dettling et al. | |
| 6,190,627 B1 | 2/2001 | Hoke et al. | |
| 6,212,882 B1 | 4/2001 | Greger et al. | |
| 6,543,217 B2 | 4/2003 | Alleving et al. | |
| 6,681,619 B2 | 1/2004 | Alleving et al. | |
| 6,695,473 B2 | 2/2004 | Unger et al. | |
| 6,835,356 B2 * | 12/2004 | Okayama | B01D 53/885 422/177 |
| 7,438,865 B2 * | 10/2008 | Collins | B01D 53/8675 422/177 |
| 7,458,343 B2 * | 12/2008 | Tanabe | F01P 11/00 123/41.69 |
| 9,220,802 B2 | 12/2015 | Noel et al. | |
| 9,295,937 B2 * | 3/2016 | Shinoda | B01D 53/66 |
| 2002/0162977 A1 | 11/2002 | Clugston, Jr. | |
| 2003/0166466 A1 | 9/2003 | Hoke et al. | |
| 2005/0129589 A1 | 6/2005 | Wei et al. | |
| 2006/0204408 A1 | 9/2006 | Son | |
| 2007/0060472 A1 | 3/2007 | Fisher et al. | |
| 2015/0118116 A1 | 4/2015 | Buelow et al. | |
| 2016/0001214 A1 * | 1/2016 | Chen | B01D 53/14 422/122 |
| 2017/0333842 A1 | 11/2017 | Robinson et al. | |

FOREIGN PATENT DOCUMENTS

| | | | |
|---|---|---|---|
| JP | H11253818 | 9/1999 | |
| KR | 2019 002392 A * | 1/2019 | .............. A61L 9/20 |
| WO | 1996022146 | 7/1996 | |
| WO | 2004112958 | 12/2004 | |

OTHER PUBLICATIONS

Tenneco, Tesla, & Technology—Autoline After Hours 352, https://www.youtube.com/watch?v=Woj710yMbol, Oct. 21, 2016.

The Argument Trump Could Use to Ban Electric Cars Outright, Anton Wahlman, https://seekingalpha.com/article/4028536-argument-trump-use-ban-electric-cars-outright, Dec. 6, 2016.

PremAir® Direct Ozone Reduction Catalyst, https://www.basf.com/en/company/sustainability/management-and-instruments/sustainable-solution-steering/examples/premair-direct-ozone-reduction-catalyst.html, accessed Dec. 19, 2018.

Photo catalytic degradation as a tool in the reduction of ambient air pollution, Cyriel Mentink et al., http://www.irbnet.de/daten/iconda/CIB21712.pdf, accessed Dec. 19, 2018.

BASF launches next-generation PremAir® NXT catalytic coating technology, https://www.basf.com/global/en/media/news-releases/2015/01/p-15-104.html, Jan. 13, 2015.

Reduce Harmful Ground Level Ozone with New Catalyst Coating, https://automotive.basf.com/news/read/reduce-harmful-ground-level-ozone-new-catalyst-coating/, Jan. 13, 2015.

PremAir® Catalyst System—A New Approach to Cleaning the Air Abstract, https://saemobilus.sae.org/content/1999-01-3677/#abstract, Published Oct. 25, 1999 by SAE International in United States.

\* cited by examiner

SYSTEM AND METHOD FOR TREATING AMBIENT AIR

TECHNICAL FIELD

The present disclosure relates to a system and a method for treating ambient air. More particularly, the present disclosure relates to treating ambient air using a vehicle.

BACKGROUND

Depending on the operating conditions and the composition of ambient air, the exhaust gases from a modern motor vehicle may be cleaner than ambient air which is suctioned into the engine for internal combustion. The reason for this is improved technology for controlling and cleaning emissions from the engine, e.g., by means of improved combustion control, catalytic converters and hydrocarbon traps in the exhaust system, etc. Hybrid electric vehicles may also generate low emissions due to incorporation of electric power. Further, battery electric vehicles may generate substantially zero emissions due to the absence of an internal combustion engine.

Therefore, vehicles can be provided with pollution reduction or abatement mechanisms to clean ambient air during operation. Sufficient number of vehicles equipped with such pollution reduction mechanisms and operating in a particular region (for example, a city) may result in gradual reduction in ambient air pollution.

However, conventional techniques for cleaning ambient air using a vehicle typically allow ambient air to continuously access the pollution reduction mechanism irrespective of the quality of ambient air. Continuous flow of ambient air through or over the pollution reduction mechanism may also adversely impact vehicle performance in some situations. Certain types of pollution reduction mechanisms, such as catalyst coatings, may further require specific conditions (for example, a minimum temperature) to be met in order to be effective. Therefore, continuous or permanent contact between ambient air and the pollution reduction mechanism may be undesirable or ineffective in various situations.

Given description covers one or more above mentioned problems and discloses a method and a system to solve the problems.

SUMMARY

In an aspect of the present disclosure, a system for treating ambient air is provided. The system includes a flow control structure disposed on a vehicle. The flow control structure is adapted to control flow of ambient air received during movement of the vehicle. The system further includes an actuator operatively coupled to the flow control structure. The actuator is adapted to movably adjust the flow control structure. The system further includes a controller disposed on the vehicle and communicably coupled to the actuator. The controller is configured to control the actuator based on at least a quality of ambient air. The system further includes an air treatment component for selectively receiving ambient air from the flow control structure. The air treatment component is adapted to treat at least one pollutant present in ambient air. In an embodiment, the air treatment component includes at least one of a catalytically active surface and a particulate filter.

In an embodiment of the present disclosure, the system further includes a sensor configured to generate signals indicative of a quality of ambient air. The controller is further configured to receive the signals from the sensor. In some embodiments, the sensor is disposed on the vehicle. In another embodiment of the present disclosure, the controller is communicably coupled to a database. The controller is further configured to receive data indicative of the quality of ambient air from the database.

In an embodiment, the flow control structure is further adapted to selectively block flow of ambient air to the air treatment component. In various embodiments, the flow control structure includes at least one of a grill, a spoiler, a fin, a blade, a vane and a valve.

In various embodiments, the controller is further configured to control the actuator based on multiple parameters, for example, but not limited to, a vehicle performance, a location of the vehicle and a temperature of an engine of the vehicle.

In an embodiment, the system further includes an outlet for discharging treated ambient air received from the air treatment component to atmosphere. The outlet is disposed on the vehicle.

In another embodiment, the system further includes a rain sensor communicably coupled to the controller. The controller is further configured to control the actuator based on signals received from the rain sensor.

In another aspect of the present disclosure, a method for treating ambient air is provided. The method includes receiving flow of ambient air at a flow control structure during movement of a vehicle. The flow control structure is disposed on the vehicle. The method further includes movably adjusting, based on at least a quality of ambient air, the flow control structure to control flow of ambient air. The method further includes treating, by an air treatment component, at least one pollutant present in ambient air received from the flow control structure. The method further includes discharging treated ambient air to atmosphere.

In an embodiment of the present disclosure, the method further includes determining the quality of ambient air based on signals received from a sensor. In another embodiment of the present disclosure, the method further includes receiving data indicative of the quality of ambient air from a database.

In an embodiment of the present disclosure, movably adjusting the flow control structure further includes selectively blocking flow of ambient air to the air treatment component.

In various embodiments, the flow control structure is movably adjusted further based on multiple parameters, for example, but not limited to, a vehicle performance, a location of the vehicle, a temperature of an engine of the vehicle and signals received from a rain sensor.

Other features and aspects of this disclosure will be apparent from the following description and the accompanying drawings.

DETAILED DESCRIPTION

Figure 1:
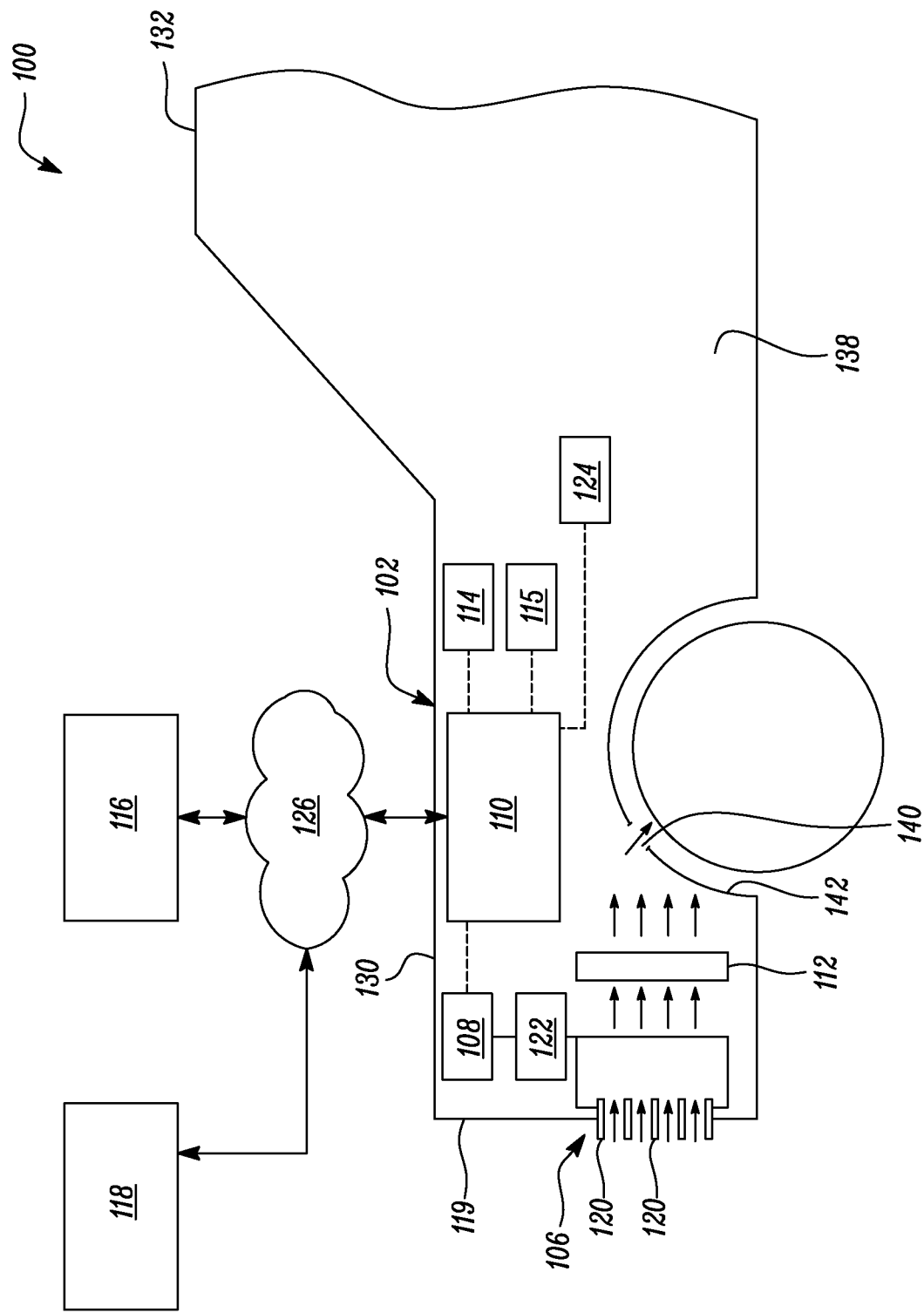
FIG. 1 is a schematic of a vehicle including a system for treating ambient air, according to an aspect of the present disclosure.

Wherever possible, the same reference numbers will be used throughout the drawings to refer to same or like parts. FIG. 1 illustrates a vehicle 100 incorporating a system 102 in accordance with the present disclosure. The vehicle 100 may be travelling on a substrate "5", such as a road. While the vehicle 100 has been depicted as a passenger car, the system 102 may be used with other types of vehicles. Examples of such vehicles include buses, trucks, off-road vehicles, and so forth. Further, the vehicle 100 may be a battery electric vehicle (BEV), a hybrid electric vehicle (HEV), or a vehicle driven by an internal combustion engine (ICEV).

The system 102 is used for treating ambient air during movement of the vehicle 100. The system 102 includes a flow control structure 106 disposed on the vehicle 100, an actuator 108 operatively coupled to the flow control structure 106, a controller 110 disposed on the vehicle 100 and communicably coupled to the actuator 108, an air treatment component 112 for selectively receiving ambient air from the flow control structure 106, one or more onboard sensors 114 disposed on the vehicle 100 and a rain sensor 115 disposed on the vehicle 100. The system 102 may further include a database 116 and one or more remote sensors 118.

The flow control structure 106 is adapted to control flow of ambient air received during movement of the vehicle 100. Further, the actuator 108 is adapted to movably adjust the flow control structure 106 to control flow of ambient air to the air treatment component 112. The flow control structure 106 is further adapted to selectively block flow of ambient air to the air treatment component 112. In the illustrated embodiment of FIG. 1, the flow control structure 106 is a front grill of the vehicle 100. The front grill may have a variety of structural and/or cosmetic configurations depending on the vehicle 100. The front grill may also prevent large objects from entering and possibly damaging interior components of the vehicle 100. The flow control structure 106 is therefore located at a front end 119 of the vehicle 100. However, in other embodiments, the flow control structure 106 may include at least one of a spoiler, a fin, one or more vanes, one or more blades and a valve.

Figure 2:
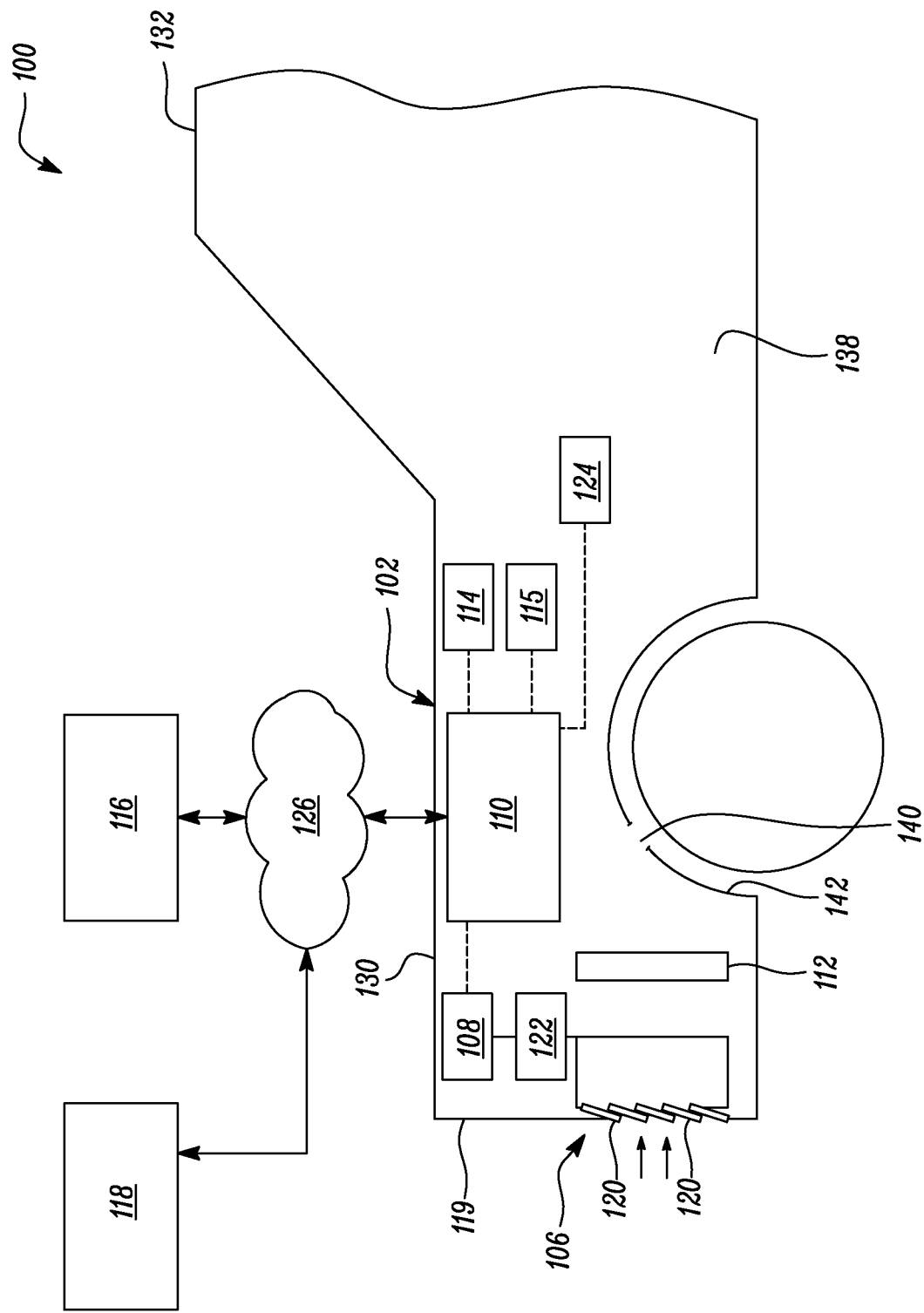
FIG. 2 illustrates the system of FIG. 1 in a closed configuration.

As shown in FIG. 1, the flow control structure 106 includes multiple grill shutters 120 that can be movably adjusted by the actuator 108. The grill shutters 120 may be disposed at the front end 119 of the vehicle 100. The grill shutters 120 may be disposed substantially parallel to each other and connected to one or more linkages. Each of the grill shutters 120 may have a suitable shape, for example, planar, curved, and so forth. Further, each of the grill shutters 120 may be pivotally adjustable about its longitudinal axis. Angular displacement of the grill shutters 120 may occur in a synchronous manner. Further, the grill shutters 120 may be movable between an open position or state (shown in FIG. 1) and a closed position or state (shown in FIG. 2). The flow control structure 106 therefore forms an actively controlled front grill system or cover. In the open position, the grill shutters 120 allow ambient air to flow to the air treatment component 112. In the closed position, the grill shutters 120 block flow of ambient air to the air treatment component 112. The grill shutters 120 may also be moved to one or more intermediate positions between the open position and the closed position in order to increase or decrease air flow to the air treatment component 112. The system 102 may therefore be in an open configuration or state in FIG. 1. Further, the system 102 may be in a closed or blocked configuration in FIG. 2.

The actuator 108 may be operatively coupled to the grill shutters 120 via a drive assembly 122. The drive assembly 122 may include one or more gears, one or more linkages and so forth. Further, the actuator 108 may be an electric motor. The actuator 108 may move the grill shutters 120 between the open position and the closed position based on control signals received from the controller 110. In an embodiment, the controller 110 may adjust a power applied to the actuator 108.

The controller 110 may include a processor, a memory, Input/Output (I/O) interfaces, communication interfaces and other components. The processor may execute various instructions stored in the memory for carrying out various operations of the controller 110. The controller 110 may receive and transmit signals and data through the I/O interfaces and the communication interfaces. In further embodiments, the controller 110 may include microcontrollers, application-specific integrated circuits (ASICs), field programmable gate arrays (FPGAs), and so forth.

The controller 110 may be communicably coupled to the onboard sensors 114, the rain sensor 115 and the actuator 108 via wired or wireless connections. The controller 110 may receive input signals from the onboard sensors 114 and the rain sensor 115. The onboard sensors 114 may include one or more ambient air sensors that generate signals indicative of a quality of ambient air. The onboard sensors 114 may detect the presence and concentration of one or more pollutants present in ambient air, for example, ozone, carbon monoxide (CO), nitrogen oxides (NOx), particulate matter, unburned hydrocarbons and so forth. The onboard sensors 114 may be disposed on an external surface of the vehicle 100 so that they can contact ambient air. Alternatively, the onboard sensors 114 may be provided at a location within the vehicle 100 that is exposed to ambient air. In an embodiment, the controller 110 may receive the signals from the onboard sensors 114 and control the actuator 108 based on at least the quality of ambient air.

The rain sensor 115 may detect the presence of rain. In an embodiment, the rain sensor 115 may be a switch activated by rainfall. Further, the rain sensor 115 may be disposed on a windshield of the vehicle 100. The controller 110 may further control the actuator 108 based on signals received from the rain sensor 115. In an embodiment, a cleaning of the air treatment component 112 may be optimized using the rain sensor 115.

The controller 110 may also be communicably coupled to an Electronic Control Unit (ECU) 124 of the vehicle 100. The controller 110 may receive input signals or data from the ECU 124 via a databus. Though in the illustrated embodiment, the controller 110 and the ECU 124 are shown as separate units, the controller 110 may also be included as part of the ECU 124. The controller 110 may be supplied with one or more vehicle parameters from the ECU 124. Such parameters may include temperature of the engine of the vehicle 100, speed of the vehicle 100, performance of the vehicle 100, location of the vehicle 100, and so forth. The vehicle performance may be related to an aerodynamic drag or fuel efficiency of the vehicle 100. The location of the vehicle 100 may be a geographic location of the vehicle 100. The geographic location of the vehicle 100 may be determined by an onboard Global Positioning System (GPS) sensor or receiver disposed on the vehicle 100. The controller 110 may control the actuator 108 based further on the temperature of the engine, vehicle performance, vehicle speed and/or the location of the vehicle 100.

The controller 110 may also be communicably coupled to the database 116 via a network 126. The network 126 may include one or more of a local area network (LAN), a wide area network (WAN), a metropolitan area network (MAN), an optical network, a wireless network, a telephone network, a cellular network, an intranet, the Internet, and so forth. The database 116 may be remotely located with respect to the vehicle 100. Further, the database 116 may be implemented on a remote server that communicates with the controller 110. The database 116 may be a relational database. The database 116 may further include ambient air quality data of various locations. The air quality data in the database 116 may be determined based on signals received from the remote sensors 118 provided at various locations. The remote sensors 118 may include ambient air sensors that generate signals indicative of a quality of ambient air at respective locations. The remote sensors 118 may detect the presence and concentration of one or more pollutants present in ambient air, for example, ozone, carbon monoxide (CO), nitrogen oxides (NOx), particulate matter, unburned hydrocarbons, Non-Methane Organic Compounds (NMOCs) and so forth. The remote server may update the database 116 based on signals received from the remote sensors 118. Further, the database 116 may be communicably coupled to the remote sensors 118 via the network 126. The controller 110 may be further configured to receive data indicative of the quality of ambient air from the database 116. In an embodiment, the controller 110 may query the database 116 for ambient air quality data corresponding to a current location of the vehicle 100. The controller 110 may further retrieve the ambient air quality data corresponding to the current location of the vehicle 100 from the database 116. In such a case, the vehicle 100 may not include any onboard sensors for detecting ambient air quality. In another embodiment, the controller 110 may directly receive signals indicative of ambient air quality from the remote sensors 118 via the network 126. Further, the controller 110 may determine the quality of ambient air based on the signals received from the remote sensors 118.

The air treatment component 112 is adapted to treat at least one pollutant present in ambient air. The pollutant may be one or more of ozone, carbon monoxide (CO), nitrogen oxides (NOx), particulate matter, unburned hydrocarbons, NMOGs and so forth. NMOGs may include various compounds (except methane) that may act as pollutants. Examples of such compounds include benzene, formaldehyde, acetone, and so forth. Further, the air treatment component 112 may include at least one of a catalytically active surface or a particulate filter. The catalytically active surface may be provided on any surface of the vehicle 100 that is selectively exposed to ambient air by the flow control structure 106. Further, the catalytically active surface may be any surface whose temperature is elevated during operation of the vehicle 100. The elevated temperature may facilitate the catalytic reaction that removes the pollutant from ambient air. The catalytically active surface may be provided on outer surfaces or finned surfaces of various components, for example, but not limited to, a radiator, an air conditioning condenser, a radiator fan, an engine oil cooler, a transmission oil cooler, a power steering fluid cooler, a charge air cooler, an electrical power source (such as, a battery), an electric motor, an engine and so forth. The catalytically active surface may also be provided on any outer surface of the vehicle 100 that is exposed to ambient air. Such an outer surface may include, for example, but not limited to, a portion of a front section 130, a roof section 132, a rear section, and side sections 138 of the vehicle 100. The front section 130 may include a hood of the vehicle 100, while the rear section may include a trunk of the vehicle 100. The side sections 138 may include doors of the vehicle 100. A catalyst material may be incorporated on a surface by various processes, such as a coating process. The catalytically active surface may therefore include a catalyst coating.

The catalyst material may assist in the conversion of pollutants present in ambient air to harmless or less harmful components. In various embodiments, the catalyst material may catalyze the reaction of ozone to form oxygen, catalyze the reaction of carbon monoxide to form carbon dioxide, catalyze the reaction of hydrocarbons to form water and carbon dioxide, and/or catalyze the reaction of NOx to form nitrogen and water. In another embodiment, the catalyst material may catalyze one or reactions of NMOGs to form harmless or less harmful compounds.

In an embodiment, the catalyst material treats ozone that may be present in ambient air. The catalyst material may then include manganese dioxide, cupric oxide, palladium, carbon and/or alumina. In another embodiment, the catalyst material treats carbon monoxide that may be present in ambient air. The catalyst material may then include platinum, palladium, rhodium, manganese dioxide, titanium dioxide, alumina, rhenium, ruthenium, gold and/or silver. In other embodiments, the catalyst material treats unsaturated hydrocarbons that may be present in ambient air. The catalyst material may then include platinum, manganese dioxide, titanium dioxide, alumina, tungsten and/or rhenium. In yet another embodiment, the catalyst material may treat both ozone and carbon monoxide present in ambient air. The catalyst material may then include platinum, manganese dioxide, carbon, palladium, titanium dioxide, alumina, zirconia and/or silica. In other embodiments, the catalyst material may treat ozone, carbon monoxide and hydrocarbons present in ambient air.

In an embodiment, the catalyst material treats NOx that may be present in ambient air. The catalyst material may then include titanium dioxide, vanadium, tungsten, molybdenum, carbon, and/or zeolite. In another embodiment, one or more injectors (not shown) may be provided upstream of the air treatment component 112 to inject a reductant into ambient air. The reductant can be urea, aqueous ammonia, and the like. NOx may be converted to diatomic nitrogen and water in the presence of the catalyst material by Selective Catalytic Reduction (SCR).

The system 102 further includes an outlet 140 for discharging treated ambient air received from the air treatment component 112 to atmosphere. The outlet 140 is disposed on the vehicle 100. In the illustrated embodiment, the outlet 140 is disposed in a wheel housing 142 of the vehicle 100. However, the outlet 140 may be disposed in any other part of the vehicle 100, for example, the front section 130, a lower surface of the vehicle 100, and so forth. Further, multiple such outlets 140 may also be provided at one or more parts of the vehicle 100. The outlet 140 may be an opening having a suitable shape. The system 102 may also include one or more ducts for transporting air from the flow control structure 106 to the outlet 140.

The controller 110 may receive signals and/or data from the onboard sensors 114, the rain sensor 115, the database 116, the remote sensors 118 and/or the ECU 124. When the vehicle 100 is stationary, the controller 110 may regulate the actuator 108 to move the grill shutters 120 to the closed position. The flow control structure 106 may therefore block flow of ambient air to the air treatment component 112. In an embodiment, the controller 110 may also keep the grill shutters 120 in closed position during startup of the vehicle 100. During initial startup or engine warm-up periods of the vehicle 100, a temperature of the engine and/or the air treatment component 112 may be below a threshold temperature required for catalytic treatment of one or more pollutants in ambient air. Therefore, flow of ambient air across the air treatment component 112 may be ineffective for treating one or more pollutants if the temperature is below the threshold temperature. In an embodiment, the onboard sensors 114 may include a temperature sensor for determining a temperature of the catalytically active surface of the air treatment component 112. The controller 110 may then control the actuator 108 based on the temperature of the air treatment component 112. It may be therefore beneficial to maintain the heat of the air treatment component 112 during engine warm-up periods so that the temperature of the air treatment component 112 may rise. However, when one or more components of the vehicle 100 is adequately heated, ambient air is allowed to pass over the catalytically active surface of the air treatment component 112. Specifically, when the temperature of the engine and/or the air treatment component 112 is above the threshold temperature, the controller 110 may regulate the actuator 108 to move the grill shutters 120 to the open position. Ambient air may then flow to the air treatment component 112 and contacts the catalytically active surface. One or pollutants present in ambient air may be treated and treated ambient air discharged through the outlet 140 to atmosphere.

In another embodiment, the controller 110 may control the actuator 108 based on a speed of the vehicle 100. A threshold speed of the vehicle 100 may be required to ensure adequate flow of ambient air to the air treatment component 112. The controller 110 may keep the grill shutters 120 in the closed position when the speed of the vehicle 100 is below the threshold speed. The controller 110 may move the grill shutters 120 to the open position when the speed of the vehicle 100 crosses the threshold speed. The controller 110 may receive data indicative of the speed of the vehicle 100 from the ECU 124. In another embodiment, the controller 110 may control the actuator 108 to movably adjust the grill shutters 120 in order to maximize an amount of ambient air flow across the air treatment component 112.

In an embodiment, the controller 110 may also control the actuator 108 based on a quality of ambient air. For example, the controller 110 may determine that air quality is good, i.e., level of one or more pollutants in ambient air is below a predetermined threshold. Therefore, treatment of ambient air may not be required. The controller 110 may determine the quality of ambient air based on signals and/or data received from the onboard sensors 114, the database 116 and/or the remote sensors 118. If air quality is good, the controller 110 may regulate the actuator 108 to move the grill shutters 120 to the closed position. However, if air quality is poor, the controller 110 may move the grill shutters 120 to the open position.

In another embodiment, the controller 110 may control the actuator 108 based on the location of the vehicle 100. Quality of ambient air in certain locations may be good. Therefore, treatment of ambient air is not required. The controller 110 may therefore keep the grill shutters 120 in the closed position. However, certain locations may have poor air quality. The controller 110 may then move the grill shutters 120 to the open position. The controller 110 may determine the location of the vehicle 100 based on signals and/or data received from the onboard GPS sensor or a navigation unit of the vehicle 100.

In certain embodiments, the controller 110 may control the actuator 108 based on a vehicle performance. Vehicle performance may be determined based on a fuel efficiency of the vehicle 100. In certain situations, opening the grill shutters 120 may increase an aerodynamic drag on the vehicle 100, thereby reducing fuel efficiency. If the vehicle performance is below a threshold level, the controller 110 may keep the grill shutters 120 in the closed state.

In some embodiments, the controller 110 may control the actuator 108 based on signals received from the rain sensor 115. The air treatment component 112 may be covered with particulate matter due to continued exposure to ambient air, thereby requiring periodic cleaning. Specifically, the catalytically active surface of the air treatment component 112 may require periodic cleaning to maintain effectiveness of catalytic treatment. The controller 110 may determine an occurrence of rainfall based on the signals received from the rain sensor 115. Alternatively, the controller 110 may determine occurrence of rainfall based on data received from the ECU 124 which receives signals from the rain sensor 115. The cleaning of the air treatment component 112 may be optimized using the rain sensor 115. For example, the controller 110 may control the actuator 108 to move the grill shutters 120 to the open position upon detecting rainfall. Ambient air containing moisture may contact the air treatment component 112 to perform cleaning of the catalytically active surface.

Figure 3:
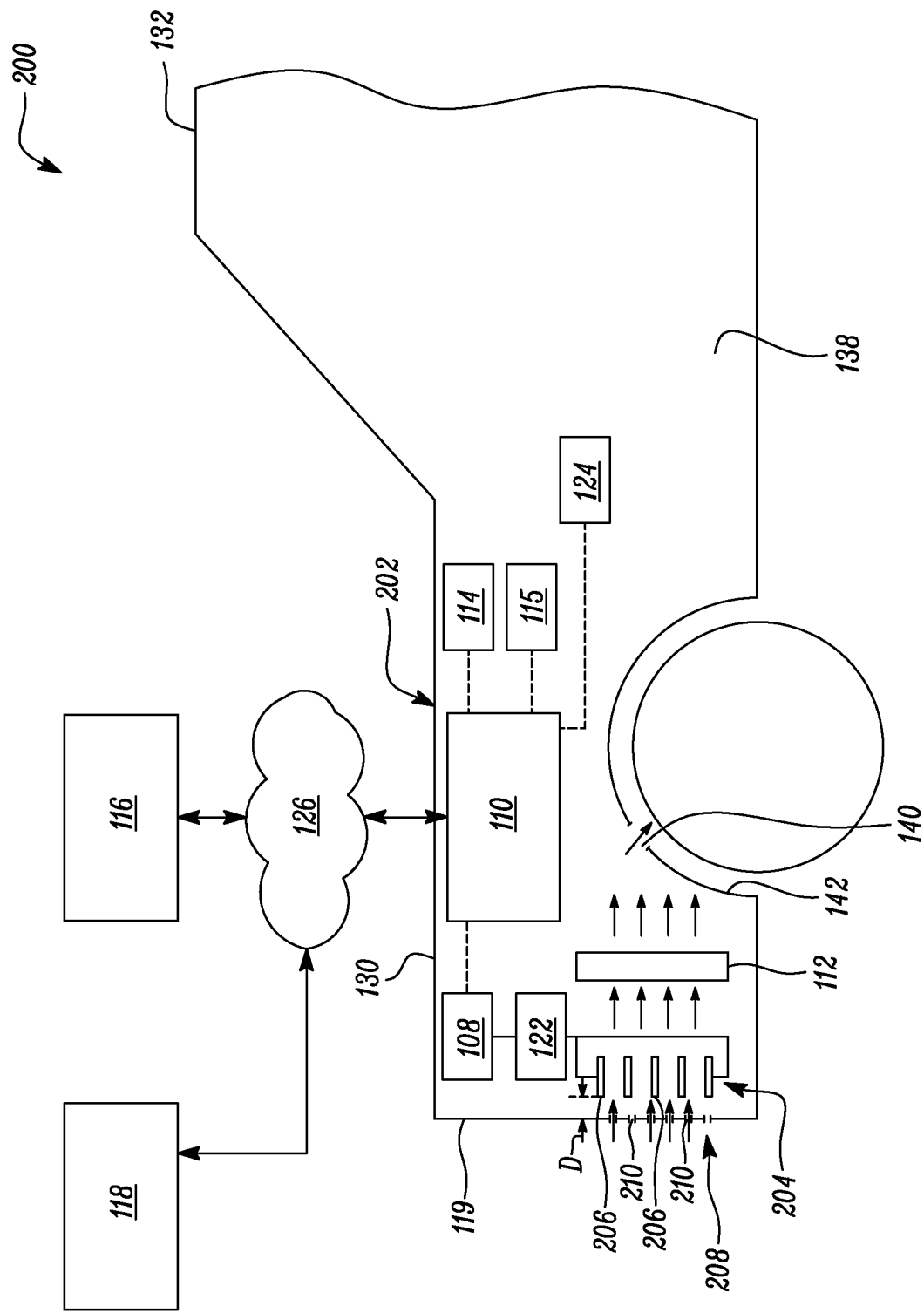
FIG. 3 is a schematic view of a vehicle including a system for treating ambient air, according to another aspect of the present disclosure.
Figure 4:
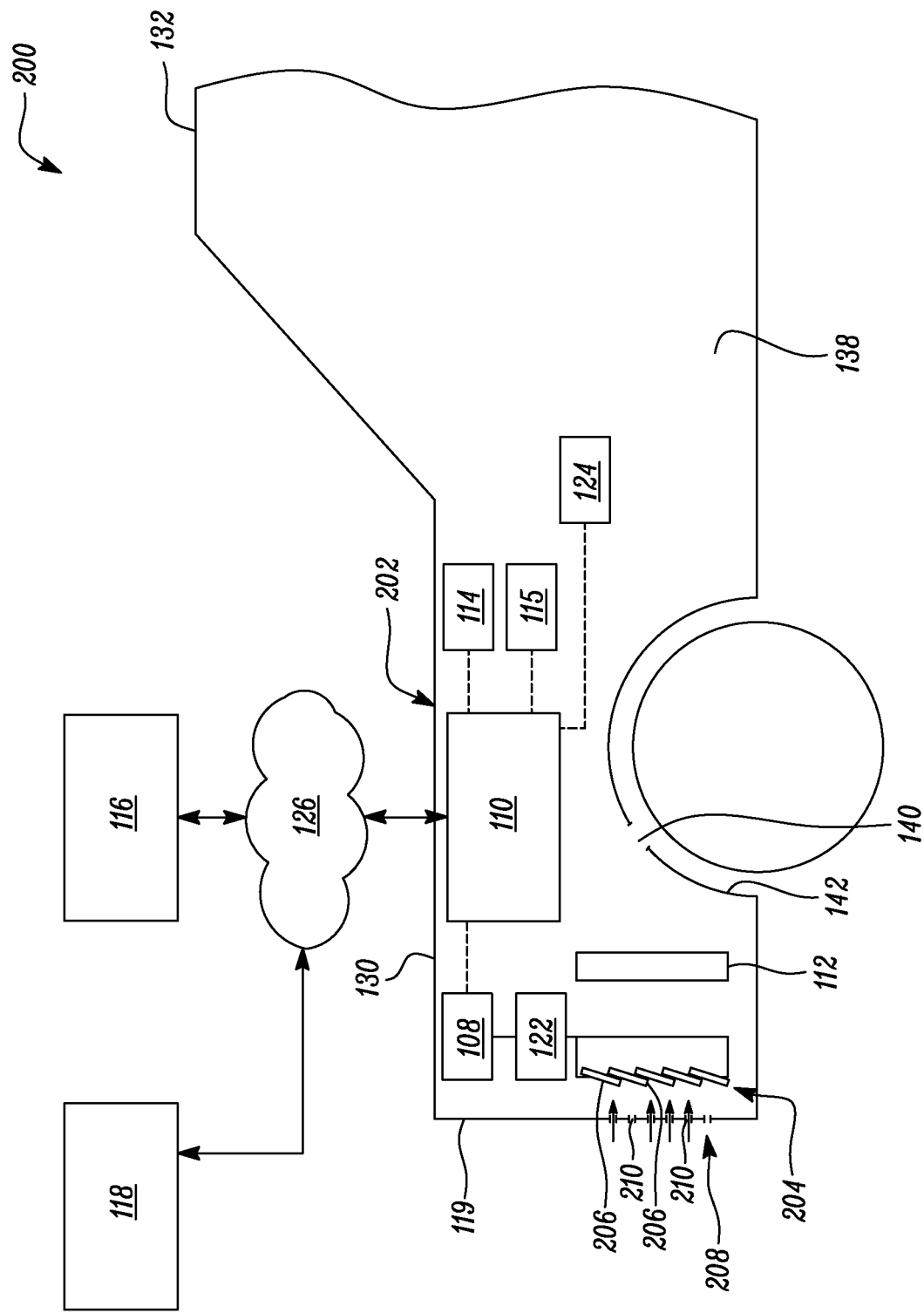
FIG. 4 illustrates the system of FIG. 3 in a closed configuration.

FIGS. 3 and 4 illustrate a vehicle 200, according to another embodiment of the present disclosure. Components that are similar in structure and/or functionality to those of the vehicle 100 (shown in FIGS. 1 and 2) have been provided with similar reference numerals. The vehicle 200 includes a system 202 for treating ambient air. The system 202 includes a flow control structure 204 that is spaced apart from the front end 119 of the vehicle 200. The flow control structure 204 may be disposed within the front section 130. Further, the flow control structure 204 may be disposed at a distance 'D' with respect to the front end 119 of the vehicle 200.

The flow control structure 204 includes multiple vanes 206 that can be movably adjusted by the actuator 108. The vanes 206 may be disposed substantially parallel to each other and connected to one or more linkages. Each of the vanes 206 may have a suitable shape, for example, planar, curved, and so forth. Further, each of the vanes 206 may be pivotally adjustable about its longitudinal axis. Angular displacement of the vanes 206 may occur in a synchronous manner. Further, the vanes 206 may be movable between an open position or state (shown in FIG. 3) and a closed position or state (shown in FIG. 4). The flow control structure 204 therefore forms an actively controlled vane system. In the open position, the vanes 206 allow ambient air to flow to the air treatment component 112. In the closed position, the vanes 206 block flow of ambient air to the air treatment component 112. The vanes 206 may also be moved to one or more intermediate positions between the open position and the closed position in order to increase or decrease air flow to the air treatment component 112. The system 202 may therefore be in an open configuration or state in FIG. 3. Further, the system 202 may be in a closed or blocked configuration in FIG. 4.

The vehicle 200 includes a front grill 208 including multiple openings 210. The front grill 208 is disposed at the front end 119 of the vehicle 100. The front grill 208 may be a passive grill structure. The openings 210 may allow flow of ambient air therethrough. The flow control structure 204 may receive flow of ambient air from the openings 210. The front grill 208 may have a variety of structural and/or cosmetic configurations depending on the vehicle 200. The front grill 208 may also prevent large objects from entering and possibly damaging interior components of the vehicle 200.

The controller 110 may control the actuator 108 to movably adjust the vanes 206 of the flow control structure 204 in a similar manner as described above with reference to FIGS. 1 and 2. Specifically, the controller 110 may control the actuator 108 based on various parameters, for example, but not limited to, the quality of ambient air, the location of the vehicle 200, speed of the vehicle 200, performance of the vehicle 200, the temperature of the engine of the vehicle 200, the temperature of the air treatment component 112, signals received from the rain sensor 115 and so forth.

Figure 5:
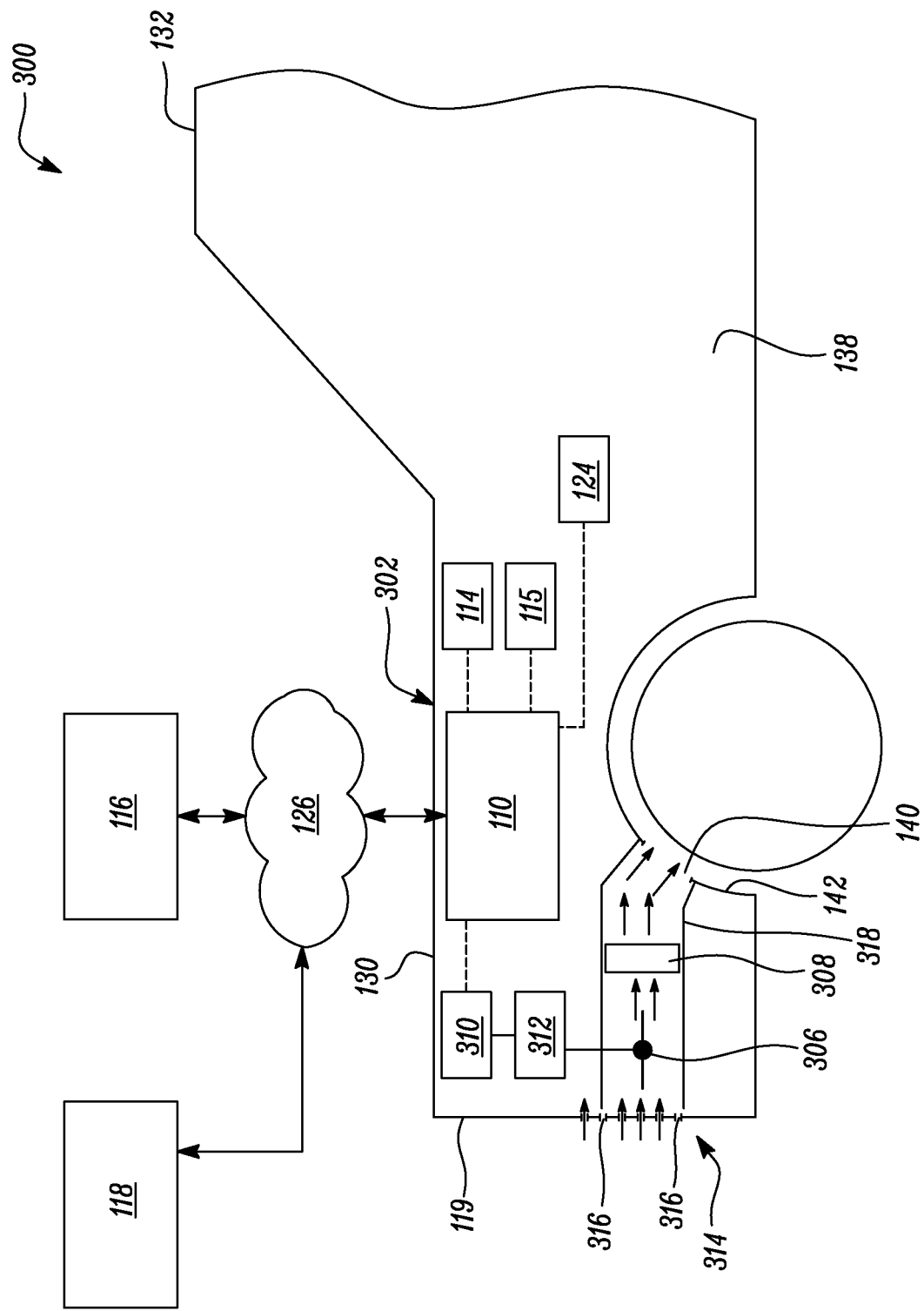
FIG. 5 is a schematic view of a vehicle including a system for treating ambient air, according to another aspect of the present disclosure.
Figure 6:
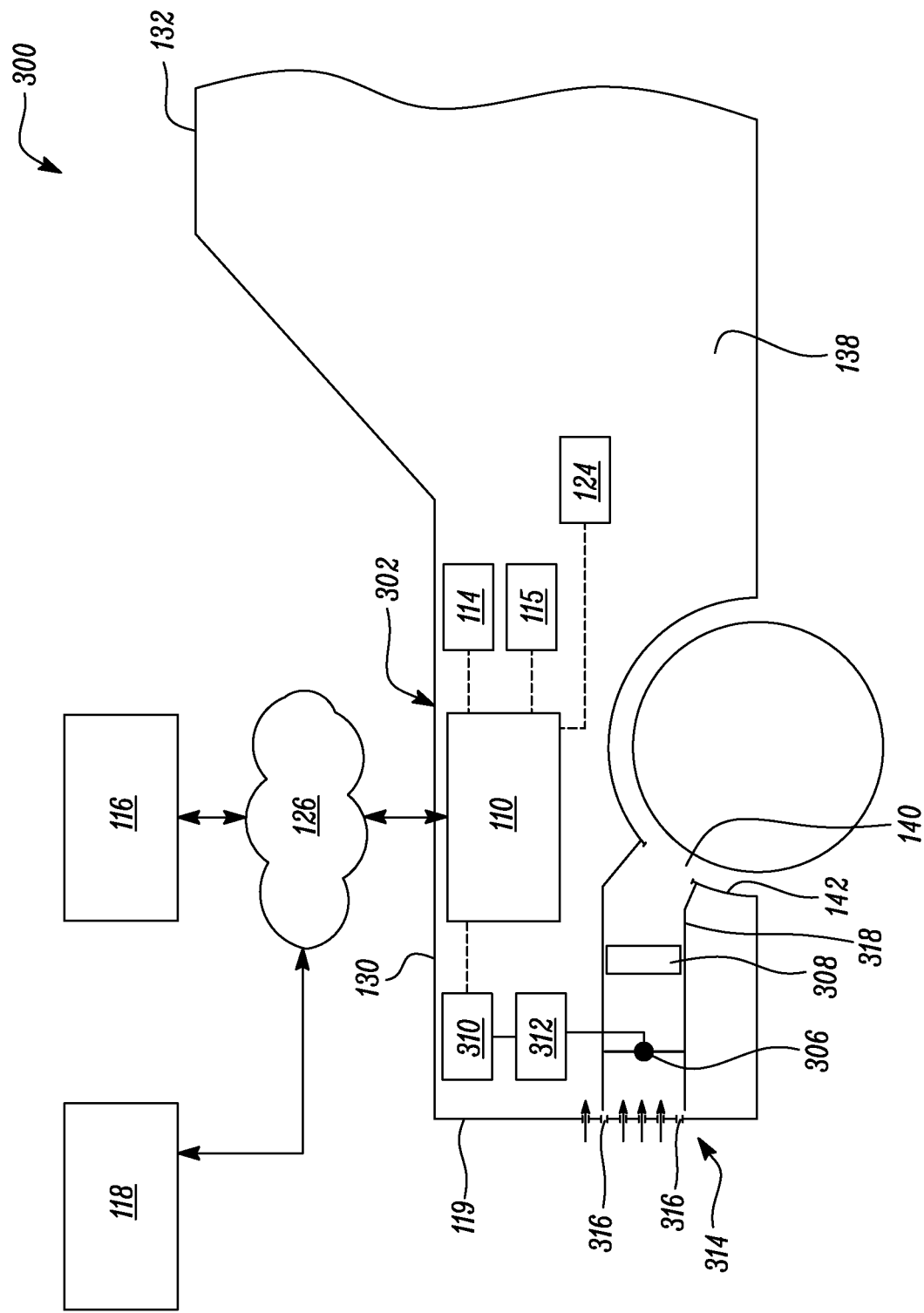
FIG. 6 illustrates the system of FIG. 5 in a closed configuration.

FIGS. 5 and 6 illustrate a vehicle 300, according to another embodiment of the present disclosure. Components that are similar in structure and/or functionality to those of the vehicle 100 (shown in FIGS. 1 and 2) have been provided with similar reference numerals. The vehicle 300 includes a system 302 for treating ambient air. The system 302 includes a flow control structure 306 and an air treatment component 308. In the illustrated embodiment, the flow control structure 306 is a valve that is actively controller by the controller 110 via an actuator 310. The actuator 310 may be an electric motor. The actuator 310 may be operatively coupled to the flow control structure 306 via a drive assembly 312. The drive assembly 312 may include one or more gears, one or more linkages and so forth. Alternatively, the actuator 310 may be directly coupled to the flow control structure 306.

In various embodiments, the flow control structure 306 may be a butterfly valve, a ball valve, a solenoid valve, and so forth. The actuator 310 can movably adjust the flow control structure 306 between an open position or state (shown in FIG. 5) and a closed position or state (shown in FIG. 6). The flow control structure 306 therefore forms an actively controlled valve system. In the open position, the flow control structure 306 allows ambient air to flow to the air treatment component 308. In the closed position, the flow control structure 306 blocks flow of ambient air to the air treatment component 308. The flow control structure 306 may also be moved to one or more intermediate positions between the open position and the closed position in order to increase or decrease air flow to the air treatment component 308. The system 302 may therefore be in an open configuration or state in FIG. 5. Further, the system 302 may be in a closed or blocked configuration in FIG. 6.

In the illustrated embodiment, the air treatment component 308 is an air filter or a particulate filter. The particulate filter is adapted to remove particulate matter from ambient air. The particulate filter may be made of paper, foam, ceramics, or any other suitable material. The particulate filter may optionally include an adsorbent (such as, charcoal) or a catalyst to remove gaseous pollutants (such as, ozone or volatile organic compounds).

In various embodiments, the controller 110 may control the actuator 108 to movably adjust the flow control structure 306 based on various parameters, for example, but not limited to, the quality of ambient air, the location of the vehicle 300, speed of the vehicle 300, performance of the vehicle 300, the temperature of the engine of the vehicle 300, the temperature of the air treatment component 308, signals received from the rain sensor 115, and so forth.

The controller 110 may control the actuator 310 based on a vehicle performance. Specifically, the controller 110 may move the flow control structure 306 to the closed position to prevent ambient air from passing through the air treatment component 308 when flow of ambient air through the air treatment component 308 decreases vehicle performance. Vehicle performance may be determined based on a fuel efficiency of the vehicle 300. In certain situations, allowing ambient air to flow through the air treatment component 308 may increase an aerodynamic drag on the vehicle 300, thereby reducing fuel efficiency. If the vehicle performance is below a threshold level, the controller 110 may keep the flow control structure 306 in the closed state.

In some embodiments, the controller 110 may control the actuator 310 based on signals received from the rain sensor 115. The air treatment component 308 may be clogged with particulate matter due to continued exposure to ambient air, thereby requiring periodic cleaning. The controller 110 may detect rainfall based on the signals received from the rain sensor 115. Alternatively, the controller 110 may determine occurrence of rainfall based on data received from the ECU 124 which receives signals from the rain sensor 115. The cleaning of the air treatment component 112 may be optimized using the rain sensor 115. For example, the controller 110 may control the actuator 310 to move the flow control structure 306 to the open position upon detecting rainfall. Ambient air containing moisture may contact the air treatment component 308 to perform a cleaning operation. In another embodiment, the system 302 may include a burner or any other heating element for periodic cleaning or regeneration of the air treatment component 308.

The vehicle 300 includes a front grill 314 including multiple openings 316. The front grill 314 is disposed at the front end 119 of the vehicle 300. The front grill 314 may be a passive grill structure. The openings 316 may allow flow of ambient air therethrough. The flow control structure 306 may receive flow of ambient air from the openings 316. The front grill 314 may have a variety of structural and/or cosmetic configurations depending on the vehicle 300. The front grill 314 may also prevent large objects from entering and possibly damaging interior components of the vehicle 300.

The system 302 may include a duct 318 to transport ambient air from the front grill 314 to the outlet 140. Specifically, the duct 318 may receive flow of ambient air from the front grill 314 at one end. The duct 318 may also be in fluid communication with the outlet 140 at another end. The duct 318 may have a hollow configuration to allow flow of air therethrough. The duct 318 may also have any suitable shape and dimensions as per requirements. The flow control structure 306 and the air treatment component 308 may be disposed within the duct 318. In the open position, the flow control structure 306 allows ambient air to flow through the air treatment component 308. Treated ambient air may then continue to flow through the duct 318 and is discharged through the outlet 140. In the closed position, the flow control structure 306 blocks passage of ambient air through the duct 318. Ambient air is therefore prevented from passing through the air treatment component 308.

Figure 7:
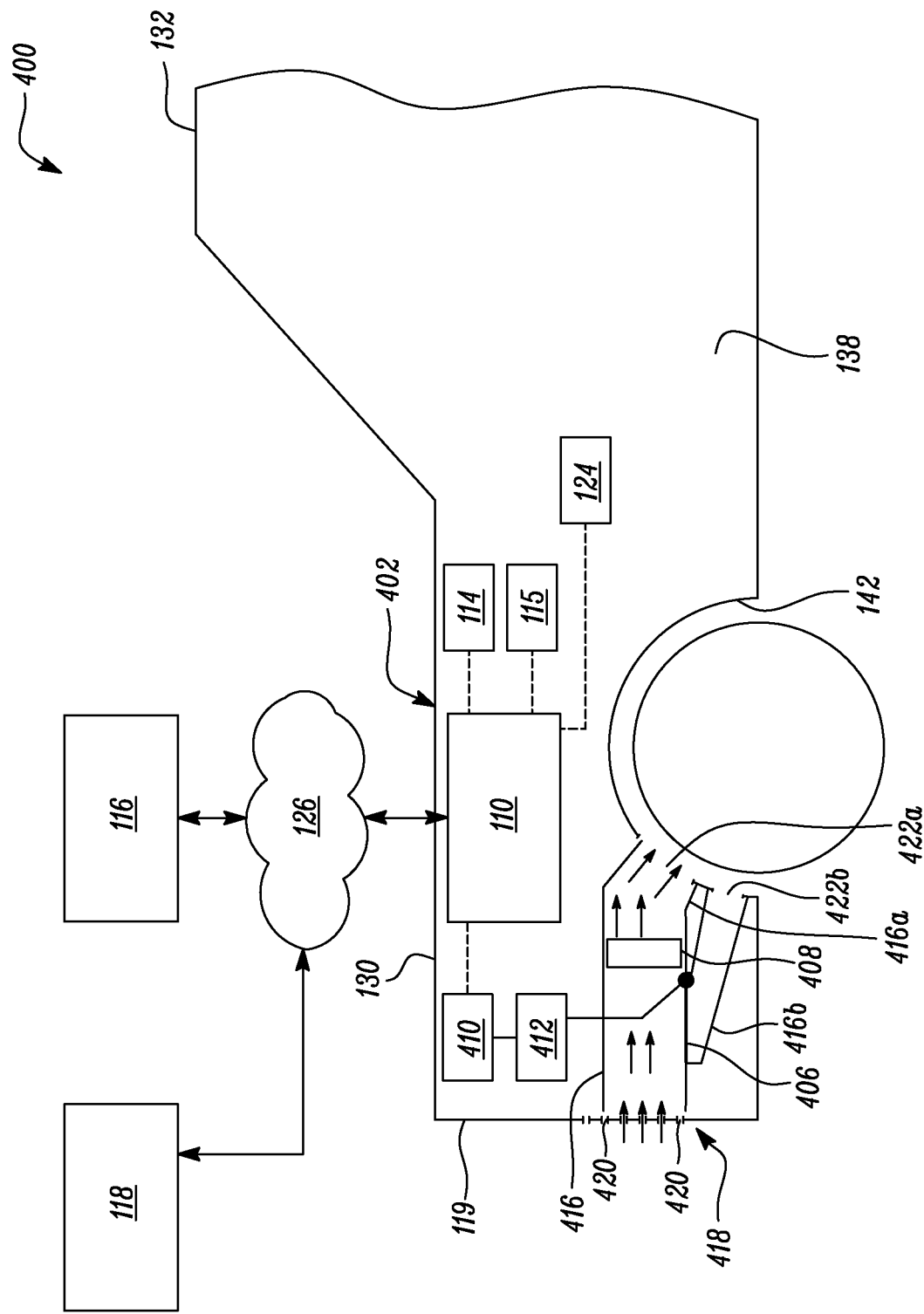
FIG. 7 is a schematic view of a vehicle including a system for treating ambient air, according to another aspect of the present disclosure.
Figure 8:
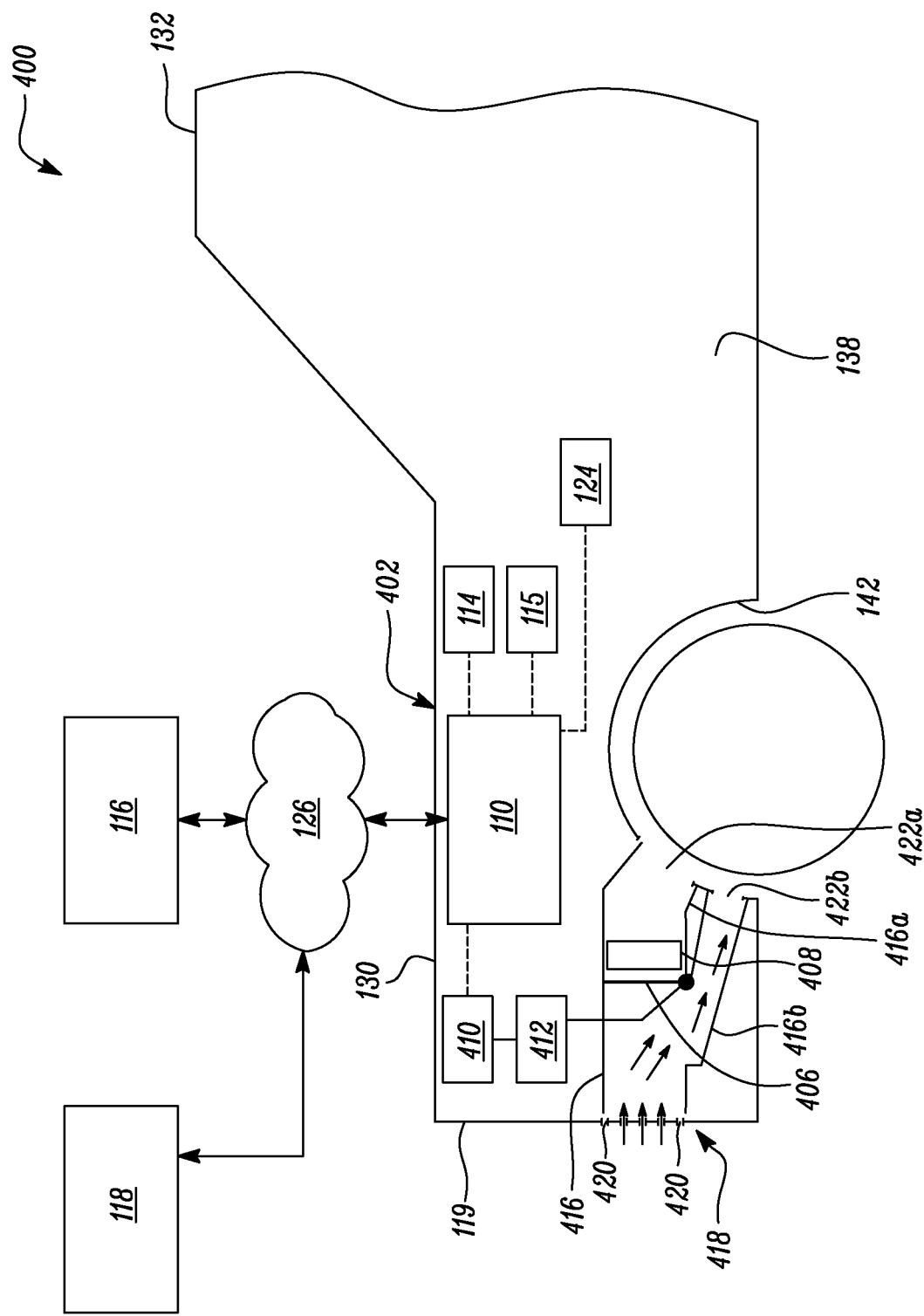
FIG. 8 illustrates the system of FIG. 7 in a blocked configuration.

FIGS. 7 and 8 illustrate a vehicle 400, according to another embodiment of the present disclosure. Components that are similar in structure and/or functionality to those of the vehicle 100 (shown in FIGS. 1 and 2) have been provided with similar reference numerals. The vehicle 400 includes a system 402 for treating ambient air. The system 402 includes a flow control structure 406 and an air treatment component 408. In the illustrated embodiment, the flow control structure 406 is a blade or a vane that is actively controller by the controller 110 via an actuator 410. In an embodiment, the flow control structure 406 may be a flow damper including multiple such blades or vanes. The actuator 410 may be an electric motor. The actuator 410 may be operatively coupled to the flow control structure 406 via a drive assembly 412. The drive assembly 412 may include one or more gears, one or more linkages and so forth. Alternatively, the actuator 410 may be directly coupled to the flow control structure 406.

The flow control structure 406 can be movably adjusted by the actuator 410. Specifically, the flow control structure 406 can be moved between a first position (shown in FIG. 7) and a second position (shown in FIG. 8). In the first position, the flow control structure 406 may allow ambient air to flow to the air treatment component 408. In the second position, the flow control structure 406 may block flow of ambient air to the air treatment component 408. The air treatment component 408 may include a catalytically active surface or a particulate filter. The system 402 may therefore be in an open configuration or state in FIG. 7. Further, the system 402 may be in a blocked configuration or state in FIG. 8.

The flow control structure 406 may be disposed in a duct 416. The duct 416 may receive flow of ambient air from a front grill 418. The front grill 418 is disposed at the front end 119 of the vehicle 400. The front grill 418 may be a passive grill structure and includes multiple openings 420. The openings 420 may allow flow of ambient air therethrough. The duct 416 may receive flow of ambient air from the openings 420. The front grill 418 may have a variety of structural and/or cosmetic configurations depending on the vehicle 400. The front grill 418 may also prevent large objects from entering and possibly damaging interior components of the vehicle 400.

As shown in FIGS. 7 and 8, the duct 416 includes first and second branches 416a and 416b located downstream of the flow control structure 406. The air treatment component 408 may be disposed in the first branch 416a. The first and second branches 416a, 416b may be in fluid communication with first and second outlets 422a, 422b, respectively. Alternatively, each of the first and second branches 416a, 416b may be in fluid communication with a common outlet. The first and second outlets 422a, 422b may be disposed in the wheel housing 142 of the vehicle 400. The first and second outlets 422a, 422b may enable discharge of ambient air from the vehicle 400.

The flow control structure 406 may be pivotally mounted within the duct 416 to change a direction of flow of ambient air. In the first position, the flow control structure 406 may block flow of ambient air to the second branch 416b. The flow control structure 406 may have suitable shape and dimensions to block flow of air to each of the first and second branches 416a, 416b. Since the second branch 416b is blocked, ambient air flows to the first branch 416a. In the first position, the flow control structure 406 may therefore allow ambient air to flow to the air treatment component 408 disposed in the first branch 416a. One or more pollutants in ambient air may be treated by the air treatment component 408. Treated ambient air may be then discharged through the first outlet 422a to atmosphere. In the second position, the flow control structure 406 may block flow of ambient air to the first branch 416a. The flow control structure 406 may therefore block flow of ambient air to the air treatment component 408 in the second position. In an embodiment, the second branch 416b may include another air treatment component (not shown). For example, the air treatment component 408 disposed in the first branch 416a may include a catalytically active surface. The other air treatment component disposed in the second branch 416b may be a particulate filter or an air filter. The flow control structure 406 may be movably adjusted to allow ambient air to flow to the air treatment component 408 or the other air treatment component.

In various embodiments, the controller 110 may control the actuator 410 to movably adjust the flow control structure 406 based on various parameters, for example, but not limited to, the quality of ambient air, the location of the vehicle 400, speed of the vehicle 400, performance of the vehicle 400, the temperature of the engine of the vehicle 400, the temperature of the air treatment component 408, signals received from the rain sensor 115, and so forth.

Figure 9:
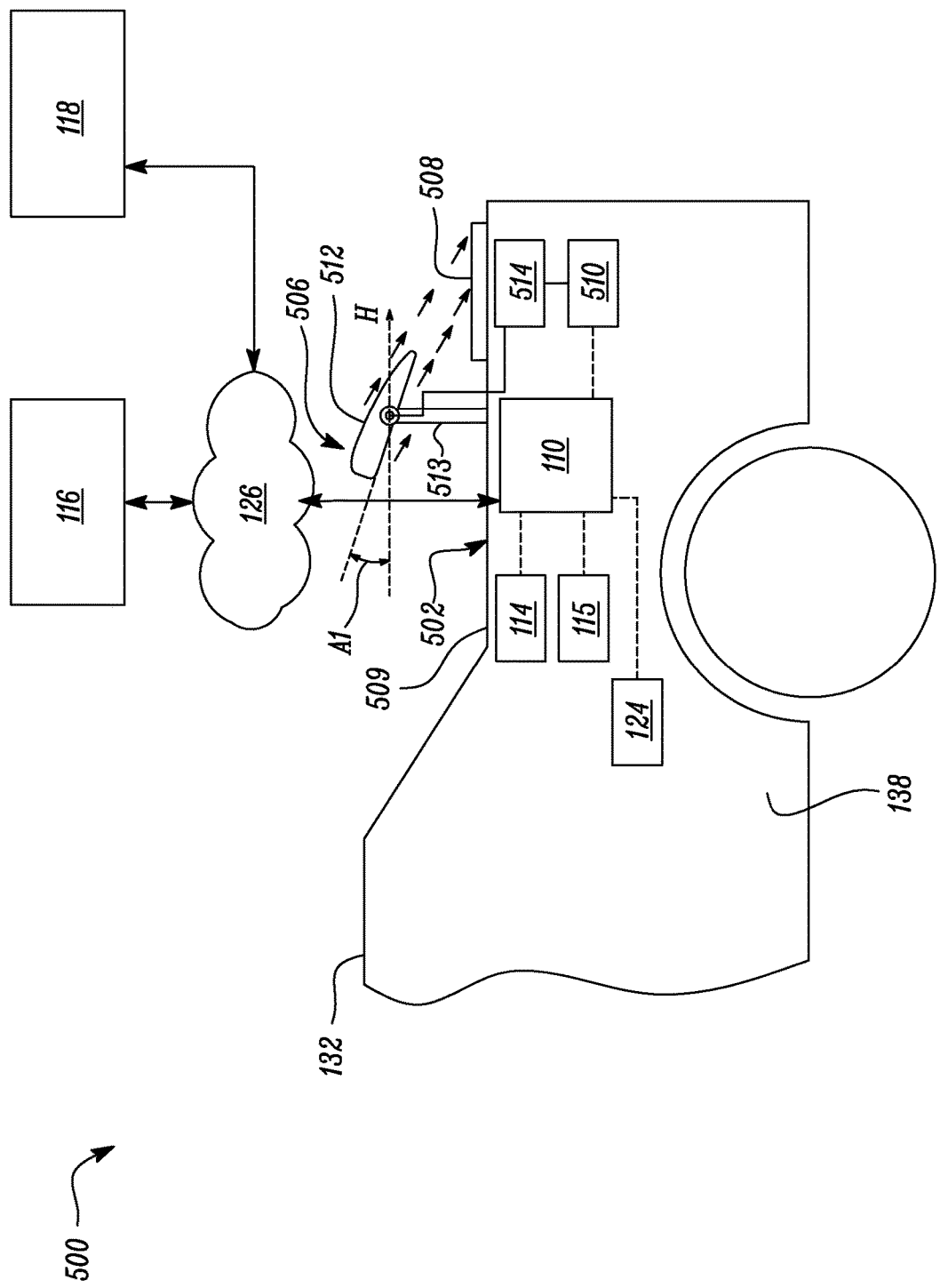
FIG. 9 is a schematic view of a vehicle including a system for treating ambient air, according to another aspect of the present disclosure.
Figure 10:
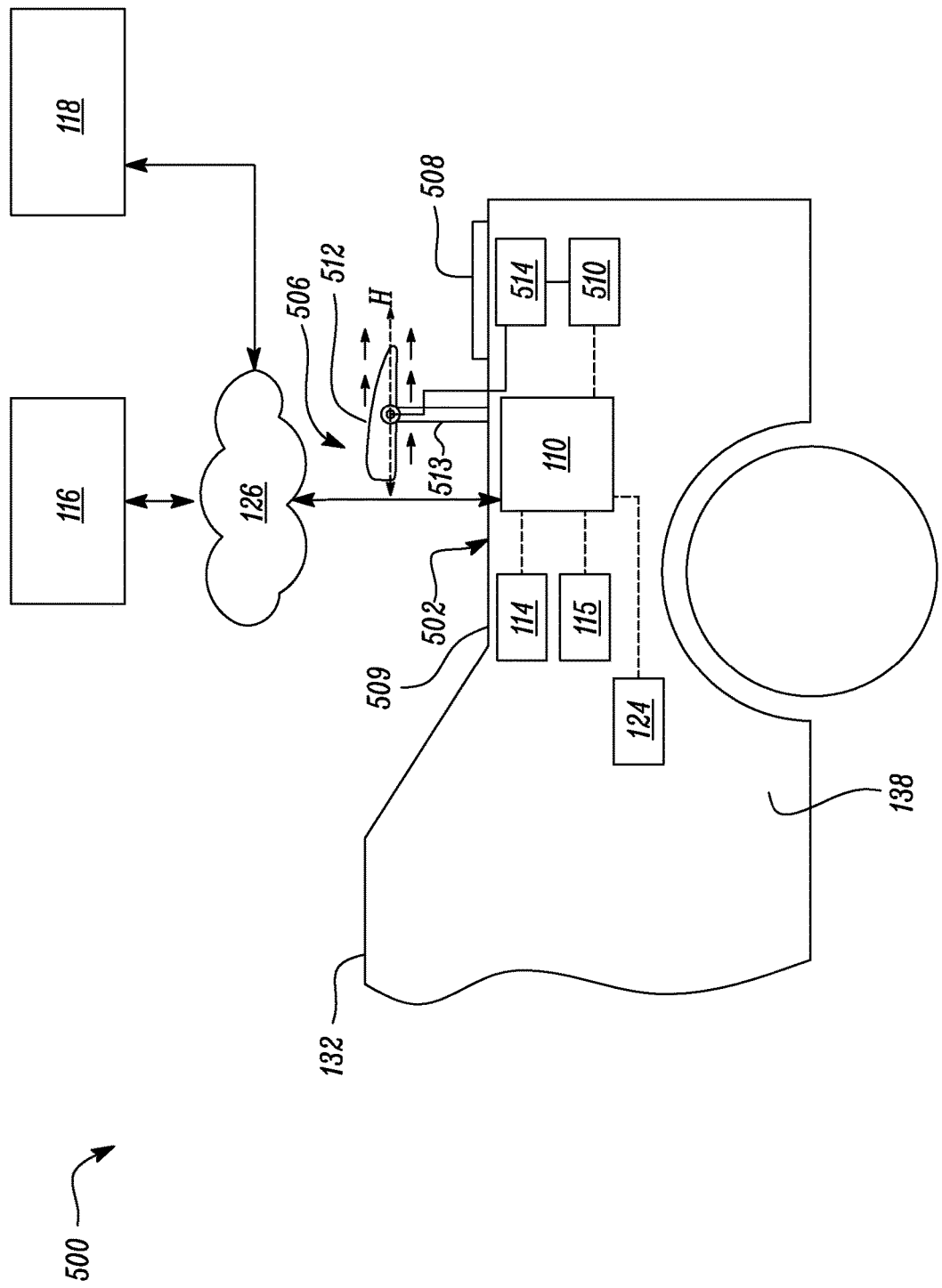
FIG. 10 illustrates the system of FIG. 9 in a blocked configuration.

FIGS. 9 and 10 illustrate a vehicle 500, according to another embodiment of the present disclosure. Components that are similar in structure and/or functionality to those of the vehicle 100 (shown in FIGS. 1 and 2) have been provided with similar reference numerals. The vehicle 500 includes a system 502 for treating ambient air. The system 502 includes a flow control structure 506 and an air treatment component 508. In the illustrated embodiment, the flow control structure 506 is a spoiler that is actively controller by the controller 110 via an actuator 510. The flow control structure 506 may therefore form an active spoiler system. The flow control structure 506 may be disposed on a rear section 509 of the vehicle 500. The air treatment component 508 includes a catalytically active surface on the rear section 509 of the vehicle 500. Alternatively, the flow control structure 506 and the air treatment component 508 may be disposed on the roof section 132 of the vehicle 500.

The flow control structure 506 includes at least one fin 512 that can be movably adjusted between a first position (shown in FIG. 9) and a second position (shown in FIG. 10). The fin 512 may be pivotally mounted on a support member 513. The fin 512 may have any suitable shape, for example, an airfoil shape. The support member 513 may be fixedly mounted on the rear section 509 of the vehicle 500. Alternatively, the support member 513 may be linearly movable on the rear section 509. The actuator 510 may be operatively coupled to the fin 512 via a drive assembly 514. The drive assembly 514 may include one or more gears, one or more linkages and so forth. Further, the actuator 510 may be an electric motor. The actuator 510 may move the fin 512 between the first position and the second position based on control signals received from the controller 110.

In the first position, the fin 512 may be inclined at an angle 'A1' with respect to a horizontal axis 'H'. Further, in the first position, the fin 512 may allow ambient air to flow to the air treatment component 508 during movement of the vehicle 500. In an embodiment, the controller 110 may control the actuator 510 to adjust an angular position of the fin 512 in order to maximize an amount of air flow across the air treatment component 508. In the second position, the fin 512 may be oriented substantially parallel to the horizontal axis 'H'. The fin 512 may substantially prevent ambient air from flowing to the air treatment component 508 in the second position. The system 502 may therefore be in an open configuration or state in FIG. 9. Further, the system 502 may be in a blocked configuration or state in FIG. 10.

In various embodiments, the controller 110 may control the actuator 510 to movably adjust the fin 512 of the flow control structure 506 based on various parameters, for example, but not limited to, the quality of ambient air, the location of the vehicle 500, speed of the vehicle 500, performance of the vehicle 500, the temperature of the engine of the vehicle 500, the temperature of the air treatment component 508, signals received from the rain sensor 115, and so forth.

The catalytically active surface of the air treatment component 508 may be covered by particulate matter due to continued exposure to ambient air. The air treatment component 508 may therefore require periodic cleaning. The controller 110 may detect rainfall based on signals received from the rain sensor 115. The controller 110 may then control the actuator 510 to move the fin 512 to the first position, thereby allowing ambient air containing moisture to contact the catalytically active surface of the air treatment component 508. The rain sensor 115 may therefore enable optimal cleaning of the air treatment component 508.

The systems 102, 202, 302, 402 and 502, as described above, are exemplary in nature and alternative configurations may be possible within the scope of the present disclosure. For example, a vehicle may include any combination of the systems 102, 202, 302, 402 and 502. Specifically, the vehicle may include multiple flow control structures and air treatment components.

Figure 11:
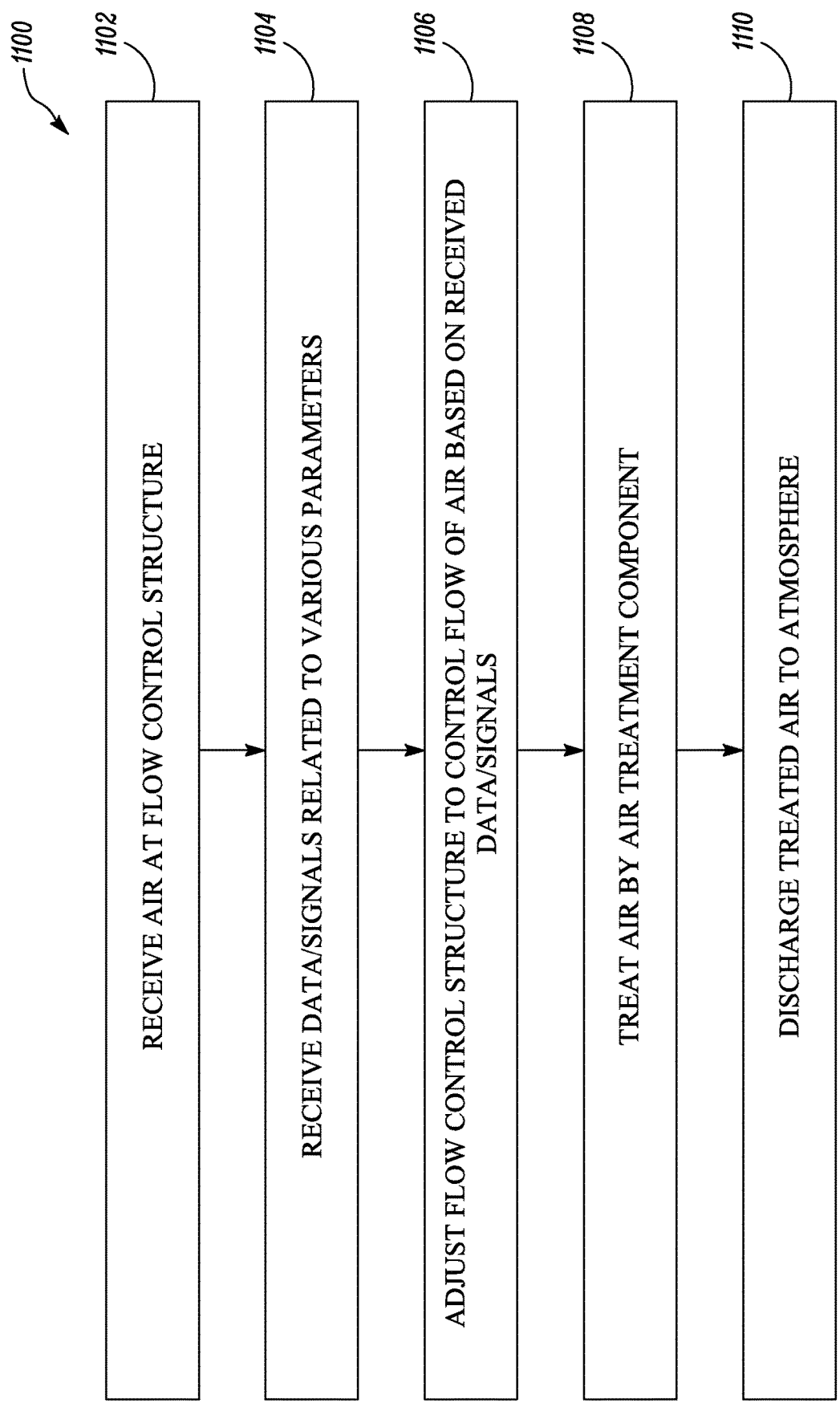
FIG. 11 is a method for treating ambient air, according to an aspect of the present disclosure.

FIG. 11 illustrates a method 1100 of treating ambient air, according to an embodiment of the present disclosure. The method 1100 may be implemented using any of the systems 102, 202, 302, 402 and 502 described above. However, the method 1100 will be described with respect to the system 102 and the vehicle 100. At step 1102, the method 1100 includes receiving a flow of ambient air at the flow control structure 106 during movement of the vehicle 100. The flow control structure 106 is disposed on the vehicle 100. At step 1104, the method 1100 includes receiving data and/or signals related to or indicative of various parameters, for example, but not related to, ambient air quality, engine temperature, vehicle performance, vehicle speed, temperature of the air treatment component 112, occurrence of rainfall, and so forth. The controller 110 may receive the data and/or signals related to the various parameters from the onboard sensors 114, the rain sensor 115, the database 116, the remote sensors 118 and/or the ECU 124. In an embodiment, the controller 110 may determine the quality of ambient air based on signals received from the onboard sensors 114. In another embodiment, the controller 110 may receive data indicative of the quality of ambient air from the database 116. In an alternative embodiment, the controller 110 may determine the quality of ambient air based on signals received directly from the remote sensors 118.

At step 1106, the method 1100 includes movably adjusting the flow control structure 106 to control flow of ambient air to the air treatment component 112 based on the received data and/or signals. In an embodiment, the flow control structure 106 may be movably adjusted based on at least the quality of ambient air. Specifically, the controller 110 may regulate the actuator 108 to movably adjust the grill shutters 120 between the open position and the closed position. The controller 110 may movably adjust the actuator 108 to selectively block flow of ambient air to the air treatment component 112. The controller 110 may further movably adjust the grill shutters 120 of the flow control structure 106 based on various parameters and/or signals, for example, but not limited to, the temperature of the engine of the vehicle 100, the quality of ambient air, vehicle performance, vehicle speed, signals received from the rain sensor 115, and so forth.

At step 1108, the method 1100 includes treating, by the air treatment component 112, at least pollutant present in ambient air received from the flow control structure 106. The air treatment component 112 may treat the at least one pollutant present in ambient air by catalytic reaction, filtering, adsorption, or a combination thereof. At step 1110, the method 1100 includes discharging treated ambient air from the air treatment component 112 to atmosphere. The treated ambient air may be discharged through the outlet 140 of the vehicle 100.

The systems and systems of the present disclosure may enable treatment of ambient air using an air treatment component disposed on a vehicle. A flow control structure may control flow of ambient air to the air treatment component. The flow control structure may receive flow of ambient air during movement of the vehicle. The flow control structure can be movably adjusted by the actuator to maximize a flow of ambient air to the air treatment component. The flow control structure can also be movably adjusted to block flow of ambient air to the air treatment component in certain situations when contact between ambient air and the air treatment component may be ineffective or undesirable. The flow control structure may be movably adjusted based on various parameters, for example, but not limited to, the quality of ambient air, engine temperature, the temperature of the air treatment component, vehicle speed, the location of the vehicle, occurrence of rainfall, and so forth. The systems and methods of the present disclosure may therefore enable active control of ambient air flow to the air treatment component.

Treating ambient air may result in a net sub-zero level emissions for the vehicle during operation. Further, after a sufficient period of time of vehicle operation, the accrued sub-zero level emissions may also lead to net sub-zero level vehicle emissions for a life cycle of the vehicle.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for treating ambient air, the system comprising:
   a flow control structure disposed on a vehicle, the flow control structure adapted to control flow of ambient air received during movement of the vehicle;
   an actuator operatively coupled to the flow control structure, the actuator adapted to movably adjust the flow control structure;
   a controller disposed on the vehicle and communicably coupled to the actuator, the controller configured to control the actuator based on at least a quality of ambient air and based on one of a temperature of an engine of the vehicle, a vehicle performance, or a location of the vehicle; and an air treatment component for selectively receiving ambient air from the flow control structure, the air treatment component adapted to treat at least one pollutant present in ambient air.

2. The system of claim 1, further comprising a sensor configured to generate signals indicative of a quality of ambient air, wherein the controller is further configured to receive the signals from the sensor.

3. The system of claim 2, wherein the sensor is disposed on the vehicle.

4. The system of claim 1, wherein the controller is communicably coupled to a database, wherein the controller is further configured to receive data indicative of the quality of ambient air from the database.

5. The system of claim 1, wherein the flow control structure is further adapted to selectively block flow of ambient air to the air treatment component.

6. The system of claim 1, wherein the flow control structure includes at least one of a front grill, a spoiler, a fin, a blade, a vane and a valve.

7. The system of claim 1, wherein the air treatment component includes at least one of a catalytically active surface and a particulate filter.

8. The system of claim 1, further comprising an outlet for discharging treated ambient air received from the air treatment component to atmosphere, wherein the outlet is disposed on the vehicle.

9. The system of claim 1, further comprising a rain sensor communicably coupled to the controller, wherein the controller is further configured to control the actuator based on signals received from the rain sensor.

10. A method for treating ambient air, the method comprising:
    receiving flow of ambient air at a flow control structure during movement of a vehicle, wherein the flow control structure is disposed on the vehicle;
    movably adjusting, based on at least a quality of ambient air and one of a temperature of an engine of the vehicle or a vehicle performance, the flow control structure to control flow of ambient air;
    treating, by an air treatment component, at least one pollutant present in ambient air received from the flow control structure; and
    discharging treated ambient air to atmosphere.

11. The method of claim 10, further comprising determining the quality of ambient air based on signals received from a sensor.

12. The method of claim 10, further comprising receiving data indicative of the quality of ambient air from a database.

13. The method of claim 10, wherein movably adjusting the flow control structure further comprises selectively blocking flow of ambient air to the air treatment component.

14. The method of claim 10, wherein the flow control structure is movably adjusted further based on signals received from a rain sensor.

15. A system for treating ambient air, the system comprising:
    a flow control structure disposed on a vehicle, the flow control structure adapted to control flow of ambient air received during movement of the vehicle;
    an actuator operatively coupled to the flow control structure, the actuator adapted to movably adjust the flow control structure;
    a controller disposed on the vehicle and communicably coupled to the actuator, the controller configured to control the actuator based on at least a quality of ambient air;
    an air treatment component for selectively receiving ambient air from the flow control structure, the air treatment component adapted to treat at least one pollutant present in ambient air; and
    a rain sensor communicably coupled to the controller, wherein the controller is further configured to control the actuator based on signals received from the rain sensor.

16. The system of claim 15, further comprising a sensor configured to generate signals indicative of a quality of ambient air, wherein the controller is further configured to receive the signals from the sensor.

17. The system of claim 16, wherein the sensor is disposed on the vehicle.

18. The system of claim 15, wherein the controller is communicably coupled to a database, wherein the controller is further configured to receive data indicative of the quality of ambient air from the database.

19. The system of claim 15, wherein the flow control structure is further adapted to selectively block flow of ambient air to the air treatment component.

* * * * *